(12) United States Patent
Bornand et al.

(10) Patent No.: US 10,865,904 B2
(45) Date of Patent: Dec. 15, 2020

(54) VALVE ASSEMBLY AND METHOD OF MAKING

(71) Applicant: Mueller Refrigeration, LLC, Hartsville, TN (US)

(72) Inventors: Mark Bornand, Gallatin, TN (US);
Xin Ming Li, Lebanon, TN (US);
Ralph Davis, Hartsville, TN (US)

(73) Assignee: MUELLER REFRIGERATION LLC, Hartsville, TN (US)

( * ) Notice: Subject to any disclaimer, the term of this patent is extended or adjusted under 35 U.S.C. 154(b) by 0 days.

(21) Appl. No.: 16/127,280

(22) Filed: Sep. 11, 2018

(65) Prior Publication Data
US 2020/0080659 A1    Mar. 12, 2020

(51) Int. Cl.
*F16K 27/06*    (2006.01)
*B23P 15/00*    (2006.01)
*F16K 5/06*     (2006.01)

(52) U.S. Cl.
CPC .......... *F16K 27/067* (2013.01); *B23P 15/001* (2013.01); *F16K 5/0694* (2013.01); *F16K 5/0647* (2013.01)

(58) Field of Classification Search
CPC ..... F16K 5/0694; F16K 27/067; B23P 15/001
USPC .................................................... 137/315.19
See application file for complete search history.

(56) References Cited

U.S. PATENT DOCUMENTS

| | | | |
|---|---|---|---|
| 3,919,756 A * | 11/1975 | Kajrup | B23P 15/001 29/890.129 |
| 4,141,538 A | 2/1979 | Bake et al. | |
| 5,577,709 A | 11/1996 | Gugala et al. | |
| 5,735,047 A * | 4/1998 | Evans | B23P 15/001 29/890.13 |
| 6,425,571 B1 * | 7/2002 | Schadewald | F16K 27/067 251/286 |
| 7,337,797 B1 | 3/2008 | Miller | |
| 7,621,167 B2 * | 11/2009 | Staffend | F01C 1/34 72/168 |
| 2003/0001125 A1 | 1/2003 | Kitazawa et al. | |

FOREIGN PATENT DOCUMENTS

| | | |
|---|---|---|
| EP | 1180626 | 2/2002 |
| EP | 3141782 | 3/2017 |
| KR | 200402928 | 12/2005 |
| WO | 2017060486 | 4/2017 |

OTHER PUBLICATIONS

S.B. Nandeppagoudar et al., Computer Aided Simulation of Hydroforming Process, IOSR Journal of Mechanical & Civil Engineering, 5th National Conference RDME 2016, Mar. 10-11, 2016, pp. 47-55.
M. Strano et al., An inverse energy approach to determine the flow stress of tubular materials for hydroforming applications, Journal of Materials Processing Technology 146 (2004) pp. 92-96.
Mueller Refrigeration LLC, PCT/US19/13005 International Search Report, 17 pages, dated Apr. 19, 2019.

* cited by examiner

*Primary Examiner* — Kevin R Barss
(74) *Attorney, Agent, or Firm* — Eckert Seamans Cherin & Mellott, LLC

(57) ABSTRACT

A ball valve includes a valve body and a valve assembly. The valve body includes an elongated, generally tubular portion and a hydroformed stem seat. The stem seat extends generally radially from the tubular portion. The tubular portion and the stem seat are unitary. The valve assembly is coupled to the body at the stem seat.

11 Claims, 10 Drawing Sheets

FROM FIG.3A

| |
|---|
| 1008 COUPLING THE BALL VALVE ASSEMBLY TO THE VALVE BODY |
| 1040 FIXING THE NECK BUSHING BODY TO THE STEM SEAT PORTION |
| 1060 PANCAKE BRAZING THE NECK BUSHING BODY TO THE STEM SEAT PORTION |
| 1042 INSERTING THE FIRST VALVE SEAT INTO THE VALVE BODY VIA THE SECOND END |
| 1044 POSITIONING THE FIRST VALVE SEAT CONTOURED OUTER SURFACE IMMEDIATELY ADJACENT THE INNER SURFACE OF THE FIRST TRANSITION PORTION |
| 1046 INSERTING THE STEM ASSEMBLY INTO THE VALVE BODY |
| 1050 INSERTING THE STEM ASSEMBLY BODY INTO THE VALVE BODY VIA THE SECOND END |
| 1052 POSITIONING THE STEM ASSEMBLY IN THE VALVE BODY MEDIAL PORTION |
| 1056 MOVING THE STEM ASSEMBLY BODY GENERALLY RADIALLY INTO THE STEM SEAT PORTION |
| 1058 POSITIONING THE STEM ASSEMBLY BODY SUBSTANTIALLY IN THE NECK BUSHING BODY |
| 1080 INSERTING THE BALL VALVE ASSEMBLY BALL VALVE MEMBER INTO THE VALVE BODY VIA THE VALVE BODY VIA THE SECOND END |
| 1082 POSITIONING THE BALL VALVE ASSEMBLY BALL VALVE MEMBER SUBSTANTIALLY IN THE VALVE BODY MEDIAL PORTION |
| 1084 THREADABLY COUPLING THE VALVE ASSEMBLY SECOND VALVE SEAT AND THE TOROID BODY |
| 1086 INSERTING THE BALL VALVE ASSEMBLY SECOND VALVE SEAT INTO THE VALVE BODY VIA THE SECOND END |
| 1088 POSITIONING THE SECOND VALVE SEAT SUBSTANTIALLY IN THE VALVE BODY MEDIAL PORTION WITH THE TOROID BODY DISPOSED ADJACENT THE VALVE BODY SECOND TRANSITION PORTION |
| 1090 CRIMPING THE VALVE BODY SECOND TRANSITION PORTION INWARDLY AT A LOCATION CORRESPONDING TO THE TOROID BODY IS COUPLED TO THE TOROID BODY |
| 1092 ADJUSTING THE THREADABLE COUPLING BETWEEN THE BALL VALVE ASSEMBLY SECOND VALVE SEAT AND THE TOROID BODY SO AS TO COMPRESS THE BALL VALVE ASSEMBLY BALL VALVE MEMBER |

*FIG.3B*

VALVE ASSEMBLY AND METHOD OF MAKING

BACKGROUND OF THE INVENTION

Field of the Invention

This application relates to a ball valve and, more specifically, to a ball valve having a unitary tube housing with hydroformed characteristics.

Background Information

Ball valves have a body that defines a passage and a valve assembly disposed therein. The valve assembly includes a movable ball valve member disposed within the valve body as well as valve seats and other seals/gaskets. The ball valve members, the seals, and the valve seats are, typically, made from a non-metal material. These elements are effected by high temperatures. The ball valve member is a sphere having a central passage. The ball rotates between a first, closed position, wherein the ball valve member central passage is not aligned with, nor in fluid communication with, the valve body passage and a second position, wherein the ball valve member central passage is aligned with, and in fluid communication with, the valve body passage. A handle, coupled to a stem, effects the rotation of the ball valve. That is, the stem is fixed to the ball valve and rotates therewith. The stem further extends from within the valve body to a location external to the valve body. That handle is coupled to the external end of the stem.

Traditionally, valve bodies were created by welding/brazing tubular members together. The valve assembly was disposed within the valve body prior to the final brazing procedure. Further, at least one element of the valve assembly, typically identified as a "neck bushing," was welded/brazed to the valve body. This process had several disadvantages including, but not limited to (1) weakening the metal of the valve body following the application of heat which allowed leaks at the joints of the valve body, (2) improper welding/brazing of the joints on the valve body which allowed leaks at the joints of the valve body, and (3) degradation of installed non-metal valve member elements due to heat applied during the formation of the valve body. For example, the stem of the valve assembly typically included seals thereabout. If these seals were damaged, fluid escapes through the stem passage. Further, the tolerances between the valve assembly elements and the valve body also allowed for leaks.

Some of the problems with ball valves were solved by the creation of a unitary valve body. See, U.S. Pat. No. 7,337,797. That is, a unitary body eliminated the need to couple tubular elements to the valve body. The use of a unitary body, however, did not eliminate all the problems noted above. For example, elements of the valve assembly needed to be installed prior to brazing the neck bushing to the valve body. Thus, non-metal elements of the valve assembly were still exposed to heat. Further, the unitary body formed exclusively by swedging is not as strong as bodies formed by other methods combined. Further, the manufacturing techniques used on existing ball valves create a stem seat (the portion of the valve body to which the neck bushing is coupled) with a relatively thin radial thickness. That is, the stem seat is not as robust as is desirable. Further, the manufacturing techniques used on existing ball valves do not allow for minimal tolerances between the valve body and the valve assembly elements. These are all problems.

Further, known ball valves typically do not include an access port. That is, an access port is an access valve assembly that is brazed/welded to the valve body. The act of coupling the access port to the valve body could damage the non-metal valve assembly elements if they are installed prior to the installation of the access port.

Accordingly, there is a need for a ball valve having a unitary body wherein non-metal valve elements are installed after all, or substantially all, brazing/welding operations are complete. There is a further need for a valve body having a stem seat with an increased thickness. There is a further need for a valve body having better characteristics than a swedged body provides. There is a further need for a ball valve with minimal tolerances between the valve body and the valve assembly elements.

SUMMARY OF THE INVENTION

These needs, and others, are met by at least one embodiment of the disclosed and claimed concept which provides a ball valve including a valve body and a valve assembly. The valve body includes an elongated, generally tubular portion and a hydroformed stem seat. The stem seat extends generally radially from the tubular portion. The tubular portion and the stem seat are unitary. The valve assembly is coupled to the body at the stem seat.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
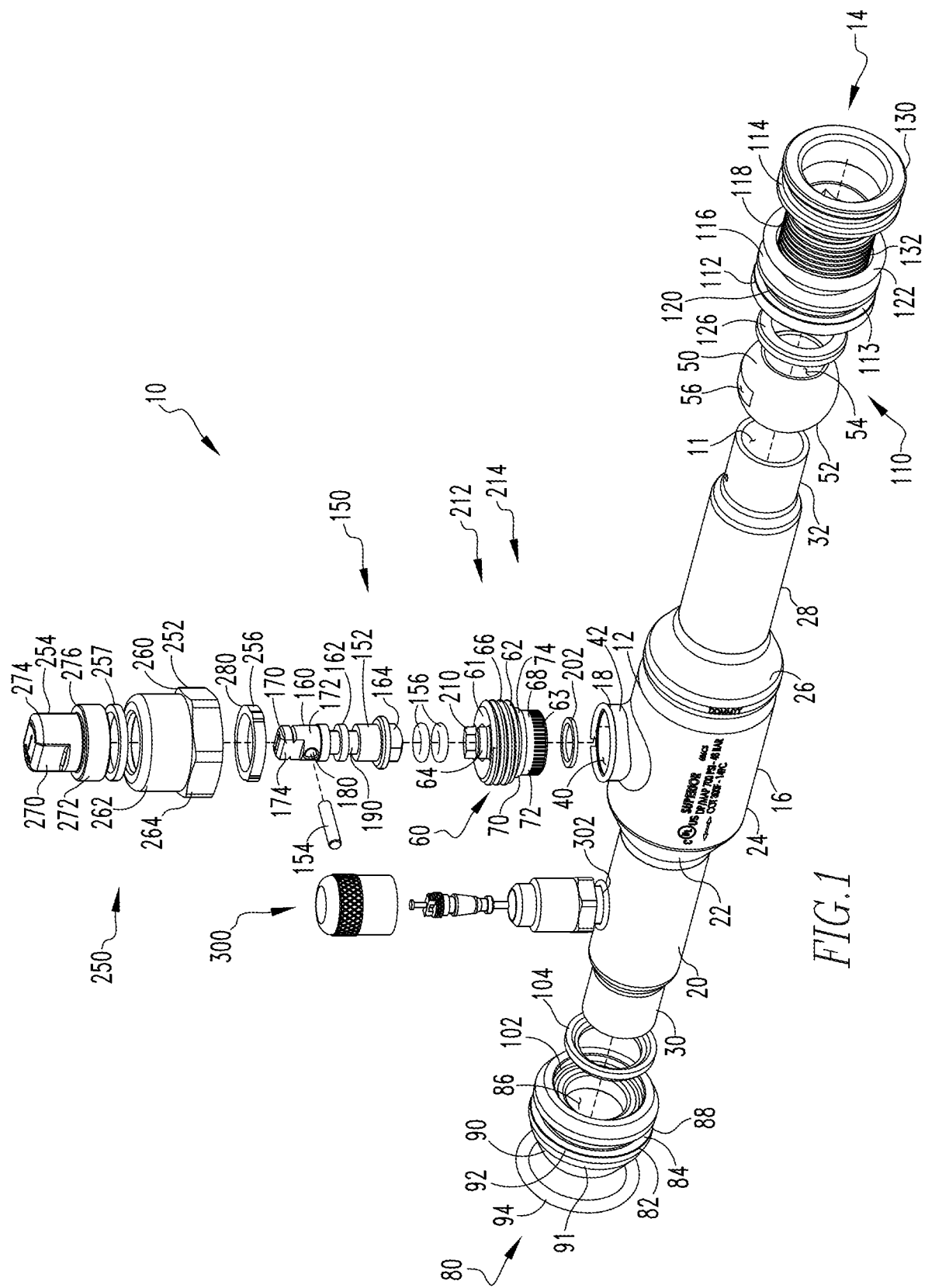
FIG. 1 is an exploded view of a ball valve.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut or threaded bore. Further, a passage in an element is part of the "coupling" or "coupling component(s)." For example, in an assembly of two wooden boards coupled together by a nut and a bolt extending through passages in both boards, the nut, the bolt and the two passages are each a "coupling" or "coupling component."

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. As used herein, "adjustably fixed" means that two components are coupled so as to move as one while maintaining a constant general orientation or position relative to each other while being able to move in a limited range or about a single axis. For example, a doorknob is "adjustably fixed" to a door in that the doorknob is rotatable, but generally the doorknob remains in a single position relative to the door. Further, a cartridge (nib and ink reservoir) in a retractable pen is "adjustably fixed" relative to the housing in that the cartridge moves between a retracted and extended position, but generally maintains its orientation relative to the housing. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, "functionally coupled" means that a number of elements or assemblies are coupled together so that a characteristic and/or function of one element/assembly is communicated or useable by the other element/assembly. For example, a characteristic of an extension cord is the ability to communicate electricity. When two extension cords are "functionally coupled," the two extension cords are coupled so that electricity is communicable through both extension cords. As another example, two wireless routers, which have the characteristic of communication data, are "functionally coupled" when the two routers are in communication with each other (but not physically coupled to each other) so that data is communicable through both routers.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "temporarily coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, "temporarily disposed" means that a first element(s) or assembly (ies) is resting on a second element(s) or assembly(ies) in a manner that allows the first element/assembly to be moved without having to decouple or otherwise manipulate the first element. For example, a book simply resting on a table, i.e., the book is not glued or fastened to the table, is "temporarily disposed" on the table.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path" relative to the body of the automobile. That is, while the wheel rotates and is in motion, the air inlet valve, as a whole, moves relative to the body of the automobile.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center of the cylinder. That is, generally, for a cylindrical soup can, the "radial side/surface" is the generally circular sidewall and the "axial side(s)/surface(s)" are the top and bottom of the soup can. Further, as used herein, "radially extending" means extending in a radial direction or along a radial line. That is, for example, a "radially extending" line extends from the center of the circle or cylinder toward the radial side/surface. Further, as used herein, "axially extending" means extending in the axial direction or along an axial line. That is, for example, an "axially extending" line extends from the bottom of a cylinder toward the top of the cylinder and substantially parallel to a central longitudinal axis of the cylinder.

As used herein, "generally curvilinear" includes elements having multiple curved portions, combinations of curved portions and planar portions, and a plurality of planar portions or segments disposed at angles relative to each other thereby forming a curve.

As used herein, a "planar body" or "planar member" is a generally thin element including opposed, wide, generally parallel surfaces, i.e., the planar surfaces of the planar member, as well as a thinner edge surface extending between the wide parallel surfaces. That is, as used herein, it is inherent that a "planar" element has two opposed planar surfaces. The perimeter, and therefore the edge surface, may include generally straight portions, e.g., as on a rectangular planar member, or be curved, as on a disk, or have any other shape.

As used herein, for any adjacent ranges that share a limit, e.g., 0%-5% and 5%-10, or, 0.05 inch-0.10 inch and 0.001 inch-0.05 inch, the upper limit of the lower range, i.e., 5% and 0.05 inch in the examples above, means slightly less than the identified limit. That is, in the example above, the range 0%-5% means 0%-4.999999% and the range 0.001 inch-0.05 inch means 0.001 inch-0.04999999 inch.

As used herein, "upwardly depending" means an element that extends upwardly and generally perpendicular from another element.

As used herein, "hydroformed characteristics" means a material that shares properties and characteristics similar, or identical, to those properties and characteristics of a metal that is formed by a high pressure forming process. Such properties are created by processes such as, but not limited to, a hydroforming process. It is noted that because "hydroformed characteristics" are created by processes that are not limited to a hydroforming process, the term relates to the material properties and characteristics and, as used herein, does not define a product by process.

As used herein, a "hydroformed stem seat" means a stem seat that has properties and characteristics similar, or identical, to those properties and characteristics of a stem seat that is formed by a high pressure forming process. Such properties are created by processes such as, but not limited to, a hydroforming process. It is noted that because "hydroformed characteristics" are created by processes that are not limited to a hydroforming process, the term relates to the material properties and characteristics of the stem seat and, as used herein, does not define a product by process.

As used herein, "cold insertion characteristics" means properties and characteristics of a non-metal material that is not exposed to heat generated by processes such as, but not limited to, brazing or welding. It is noted that such properties and characteristics are material properties and characteristics that are created by many different process so long as the material is not subsequently exposed to heat generated by processes such as, but not limited to, brazing or welding. As such, and as used herein, the term defines material properties and characteristics and not a product by process.

As used herein, "shaped body characteristics" means surface characteristics of a material created by rolling or milling a surface so as to have a surface roughness that is not higher than about Ra32 and roundness not higher than about 0.001 inch.

As used herein, "swedged" shall mean a metal construct that was once one size but has been reduced to a smaller size.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, an "end" of a body is not limited to the surface at the end of the body. For example, the upper "end" of a soup can does not mean only the axial surface of the can but also includes a portion of the radial surface extending about the axial surface, as would be understood by one of ordinary skill in the art.

As used herein, an "elongated" element inherently includes a longitudinal axis and/or longitudinal line extending in the direction of the elongation.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and/or near relevant to the term being modified as would be understood by one of ordinary skill in the art.

Figure 2:
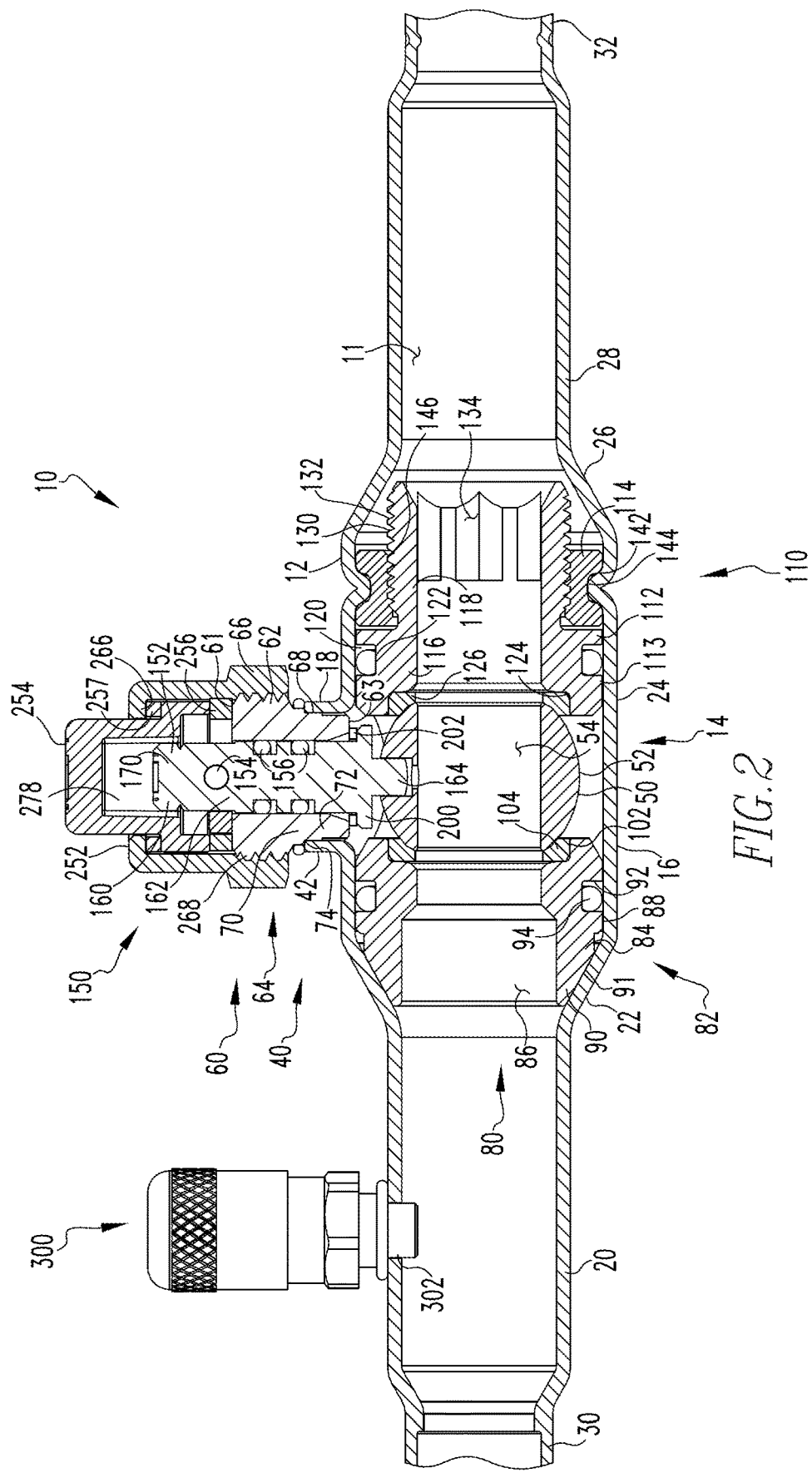
FIG. 2 is a cross-sectional side view of a ball valve.

As shown in FIGS. 1 and 2, a ball valve 10 includes a hollow unitary, elongated body 12 and a ball valve assembly 14. The valve body 12 is made of a metal selected from a group including copper, copper based alloys, ferrous steel materials and aluminum. In an exemplary embodiment, the valve body 12 has a generally circular cross-sectional area and a generally radially extending stem seat 18. That is, the valve body 12 includes a generally tubular portion 16 and stem seat 18 that extends generally radially from the tubular portion 16. The valve body tubular portion 16 (hereinafter "tubular portion" 16) and valve body stem seat 18 (hereinafter "stem seat" 18) are unitary. In an exemplary embodiment, the stem seat 18 is a hydroformed stem seat 18.

The valve body 12, i.e., the tubular portion 16, defines a passage 11. In an exemplary embodiment, the valve body 12 includes an inlet, first end 20, a first transition portion 22, a medial portion 24, and second transition portion 26, and an outlet, second end 28. In an exemplary embodiment, the valve body 12 further includes a first end coupling 30 and a second end coupling 32. Following forming operations, as described below, the valve body medial portion 24 (hereinafter "medial portion" 24) has a maximum cross-sectional area. In an exemplary embodiment, the maximum cross-sectional area is between about 0.81 in.$^2$ and 2.66 in.$^2$, or about 1.22 in.$^2$. The valve body first end 20 (hereinafter "first end" 20) has a first cross-sectional area, wherein the first cross-sectional area is smaller than the maximum cross-sectional area. In an exemplary embodiment, the first cross-sectional area is between about 0.30 in.$^2$ and 1.00 in.$^2$, or about 0.61 in.$^2$. The valve body second end 28 (hereinafter "second end" 28) has a second cross-sectional area, wherein the second cross-sectional area is smaller than the maximum cross-sectional area. In an exemplary embodiment, the second cross-sectional area is between about 0.30 in.$^2$ and 1.00 in.$^2$, or about 0.61 in.$^2$. The valve body first transition portion 22 (hereinafter "first transition portion" 22) is disposed between the first end 20 and the medial portion 24. The second transition portion 26 (hereinafter "second transition portion" 26) is disposed between the medial portion 24 and the second end 28. In an exemplary embodiment, at least one of the first and second transition portions 22, 26 has shaped body characteristics. In an exemplary embodiment, the first transition portion 22 transitions generally smoothly from the first cross-sectional area to the maximum cross-sectional area. As used herein, to "transition generally smoothly" means that, when viewed in cross-section, the transitional element is generally planar. The second transition portion 26 transitions generally smoothly from the second cross-sectional area to the maximum cross-sectional area. In an exemplary embodiment, the valve body first end coupling 30 and valve body second end coupling 32 have a cross-sectional area that is smaller than, or equal to, the first and second cross-sectional areas, respectively.

The medial portion 24 includes the stem seat 18. The stem seat 18 extends generally radially from the medial portion 24. The stem seat 18 defines a passage 40 with a generally, or substantially, circular cross-section. In an exemplary embodiment, the stem seat 18 also includes an outer radial surface that is generally, or substantially, circular in cross-section. In this embodiment, the stem seat 18 is a generally toroid collar 42 that extends about the stem seat passage 40. Further, in an exemplary embodiment, the stem seat 18 is formed via hydroforming, or a similar technique. A stem seat 18 formed in this manner is generally thicker in the radial direction (relative to the stem seat 18, not the valve body 12) compared to stem seats on prior art valve bodies. That is, the stem seat 18 has an increased radial thickness. As used herein, an "increased radial thickness" means a thickness of between about 0.45 inch and 0.65 inch. As used herein, a "specific increased radial thickness" means a thickness of about 0.55 inch. A stem seat 18 having an "increased radial thickness" or a "specific increased radial thickness" solves the problem(s) stated above.

In an exemplary embodiment, the ball valve assembly 14 includes a ball valve member 50, a neck bushing 60, a valve seat assembly 80 and a stem assembly 150. The ball valve member 50 includes a generally spherical body 52 defining a generally radially extending passage 54 and an elongated coupling slot 56 on the outer surface. The ball valve member body 52 is, in an exemplary embodiment, made from stainless steel. The ball valve member body slot 56 extends generally parallel to the ball valve member body passage 54.

The neck bushing 60 is structured to be, and is, coupled to the valve body 12 at the stem seat 18. The neck bushing 60 includes a generally cylindrical body 62 that defines a passage 64. The neck bushing body 62 includes a generally planar upper, first axial surface 61 and a generally planar lower, second axial surface 63. The neck bushing body passage 64 is sized and shaped to generally, or substantially, correspond to the stem assembly body 152 first radius, discussed below. The outer radial surface of the neck bushing body 62 includes a threaded upper portion 66 (or neck bushing body outer thread 66) and generally smooth lower portion 68. The neck bushing body threaded upper portion 66, i.e., the threads, corresponds to the seal cap assembly cap nut body second end 264, discussed below. The neck bushing body lower portion 68 is structured to be, and is, fixed to the stem seat 18. In an exemplary embodiment, the neck bushing body lower portion 68 has an upper section 70 with a larger radius and a lower section 72 with a smaller radius. The neck bushing body lower portion lower section 72 is structured to be, and is, disposed within the stem seat passage 40. Further, the transition between the neck bushing body lower portion lower section 72 and the neck bushing body lower portion upper section 70 defines a seating flange 74. The neck bushing body seating flange 74 is structured to, and does, rest upon the axial surface of the stem seat 18. As shown, and in an exemplary embodiment, a ring 75 is disposed at the neck bushing body seating flange 74. The ring 75 is structured to, and does, prevent brazing alloy and other contaminates from entering the ball valve body 12 via the stem seat passage 40 during brazing operations. In an exemplary embodiment, the neck bushing 60 is coupled, directly coupled, or fixed to the stem seat 18 via pancake brazing, as described below.

The valve seat assembly 80, generally, includes two valve seats; a first end valve seat 82 and a second end valve seat assembly 110. The first end valve seat 82 includes a generally toroid body 84 that defines a passage 86 and which has a generally cylindrical portion 88 and a tapered portion 90. The first end valve seat body tapered portion 90 is sized and shaped to generally, or substantially, correspond to the inner surface of the first transition portion 22. That is, the outer surface of the first end valve seat body tapered portion 90 is, as used herein, a first end valve seat contoured outer surface 91.

The first end valve seat body cylindrical portion 88 is sized and shaped to generally, or substantially correspond to the inner surface of the medial portion 24. The radial surface of the first end valve seat body cylindrical portion 88 defines a groove 92. A seal/gasket 94 such as, but not limited to an O-ring, is disposed in the first end valve seat body cylindrical portion groove 92. The seal 94 sealingly engages the first end valve seat body cylindrical portion 88 and the inner surface of the medial portion 24. The axial surface of the first end valve seat body cylindrical portion 88 defines a generally circular (or cylindrical) recess 102. A ball valve seal 104 is structured to be, and is, disposed in the first end valve seat body cylindrical portion recess 102. As is known, a ball valve seal 104 is structured to, and does, sealingly engage the spherical surface of a ball valve member 50. When the first end valve seat 82 is installed in the valve body 12, fluid only passes through the first end valve seat body passage 86.

The second end valve seat assembly 110 includes a seat member 112 and an adjustment mounting 114. The second end valve seat assembly seat member 112 includes a generally toroid body 113 having a first portion 116 and a second portion 118. The second end valve seat assembly seat member body first portion 116 has a greater radius than the second end valve seat assembly seat member body second portion 118. The second end valve seat assembly seat member body first portion 116 is substantially similar to the first end valve seat body cylindrical portion 88 and includes substantially similar elements in a substantially similar configuration. Those elements will not be described again but are listed so as to provide the relevant reference numbers. These elements include a groove 120, a seal/gasket 122, a recess 124, and a ball valve seal 126. As with the first end valve seat body cylindrical portion 88, the second end valve seat assembly seat member body first portion 116 is sized and shaped to generally, or substantially correspond to the inner surface of the medial portion 24. The second end valve seat assembly seat member body first portion seal/gasket 122 is disposed in the second end valve seat assembly seat member body first portion groove 120 and sealingly engages the inner surface of the medial portion 24. It is noted that the second end valve seat assembly seat member body first portion 116 mirrors the first end valve seat body cylindrical portion 88.

The second end valve seat assembly seat member body second portion 118 is, in an exemplary embodiment, unitary with the second end valve seat assembly seat member body first portion 116. The second end valve seat assembly seat member body second portion 118 is elongated. The second end valve seat assembly seat member body second portion 118 has a generally, or substantially cylindrical outer surface 130 that includes threads 132. The second end valve seat assembly seat member body second portion 118 further defines a passage 134 that extends along the center axis of the second end valve seat assembly seat member body second portion 118. In an exemplary embodiment, the second end valve seat assembly seat member body second portion passage 134 has a generally hexagonal cross-section.

The second end valve seat assembly adjustment mounting 114 includes a generally toroid body 140 having an outer radial surface 142 sized and shaped to generally, or substantially correspond to the inner surface of the medial portion 24. The second end valve seat assembly adjustment mounting body outer radial surface 142 also includes a mounting groove 144. As discussed below, the valve body 12 is crimped at a location corresponding the second end valve seat assembly adjustment mounting body mounting groove 144 thereby coupling, directly coupling, or fixing the second end valve seat assembly adjustment mounting 114 to the valve body 12. The second end valve seat assembly adjustment mounting body inner radial surface defines threads 146 that correspond to the second end valve seat assembly seat member body second portion outer surface threads 132. Thus, when these threads 132, 146 are threadably coupled, and when the second end valve seat assembly adjustment mounting 114 is fixed to the valve body 12, rotation of the second end valve seat assembly seat member 112 causes the second end valve seat assembly seat member 112 to move axially in the valve body 12. Thus, the valve seat assembly 80 is structured to, and does, adjustably engage the ball valve member 50. That is, as the second end valve seat assembly seat member 112 moves axially, the two ball valve seals 104, 126 engage the ball valve member 50 with more or less force depending upon the direction of rotation. It is noted that the hexagonal second end valve seat assembly seat member body second portion passage 134 is easily engaged by hexagonal tools such as, but not limited to, an Allen wrench.

The stem assembly 150, in an exemplary embodiment, includes a generally cylindrical body 152, a retaining pin 154, a number of seals 156 and a seal cap assembly 250. The stem assembly body 152 is elongated and generally cylindrical having a first radius. The stem assembly body 152 includes an upper end 160, a medial portion 162, and a lower end 164. The stem assembly body upper end 160 includes a non-circular upper portion 170 and a circular lower portion 172. The stem assembly body upper end upper portion 170 includes two opposed generally planar surfaces 174 that extend generally parallel to the stem assembly body 152 longitudinal axis. The stem assembly body upper end upper portion 170 is structured to be, and is, engaged by a tool or another element. That is, the stem assembly body upper end upper portion 170 is non-circular and, as such, is easier to engage than a generally cylindrical element. The stem assembly body upper end lower portion 172 is generally cylindrical and includes a radially extending passage 180. The stem assembly body upper end lower portion passage 180 is sized to correspond to the stem assembly retaining pin 154.

The stem assembly body medial portion 162 includes a number of circumferential grooves 190 (two shown). A stem assembly seal 156, shown as O-rings, are disposed in the stem assembly body medial portion grooves 190. These stem assembly seals 156 are structured to, and do, sealingly engage the neck bushing body passage 64 when the stem assembly body 152 is disposed in the neck bushing body passage 64.

The stem assembly body lower end 164 includes a radially extending flange 200. The stem assembly body lower end flange 200 has a greater diameter than the neck bushing body passage 64. Thus, to dispose the stem assembly body 152 in the neck bushing body passage 64, the stem assembly body upper end 160 is initially moved into the neck bushing body passage 64 and the stem assembly body 152 is advanced until the stem assembly body lower end flange 200 abuts the neck bushing second axial surface 63. In an exemplary embodiment, the stem assembly 150 includes an anti-friction ring 202 that is disposed between the stem assembly body lower end flange 200 and the neck bushing body second axial surface 63. As used herein, the stem assembly body lower end flange 200 "abuts" the neck bushing body second axial surface 63 even if an anti-friction ring 202 is disposed therebetween.

Moreover, when assembled, the stem assembly 150 is rotatably trapped on, or to, the neck bushing body 62. As used herein, "trapped" means that one element is coupled to another element and cannot be decoupled without the removal on one or more coupling components/coupling elements. In an exemplary embodiment, the stem assembly 150 is rotatably trapped on the neck bushing body 62 by the stem assembly retaining pin 154 and the stem assembly body lower end flange 200. That is, the stem assembly 150 is rotatably coupled to the neck bushing body 62 by passing the stem assembly body 152 through the neck bushing body passage 64 until the stem assembly body lower end flange 200 abuts the neck bushing body second axial surface 63, as described above. The spacing between the stem assembly body upper end lower portion passage 180 and the upper surface of the stem assembly body lower end flange 200 generally, or substantially, corresponds to the height of the neck bushing body 62. Thus, when the stem assembly body lower end flange 200 abuts the neck bushing body second axial surface 63, the stem assembly body upper end lower portion passage 180 is disposed at, and extends parallel to, the neck bushing body first axial surface 61. The stem assembly retaining pin 154 is passed through the stem assembly body upper end lower portion passage 180. In this configuration, the stem assembly 150 is rotatably trapped on, or to, the neck bushing body 62.

In an exemplary embodiment, the neck bushing body first axial surface 61 includes a rotation limiter 210. In an exemplary embodiment, the rotation limiter 210 includes a number of first stops 212 and a number of second stops 214. The rotation limiter number of first stops 212 and the rotation limiter number of second stops 214 extend axially from the neck bushing body first axial surface 61. The rotation limiter number of first stops 212 and the rotation limiter number of second stops 214 are disposed in the path of travel of the stem assembly retaining pin 154. The rotation limiter stops 212, 214 are structured to, and do, prevent movement, i.e., of the stem assembly retaining pin 154 past the rotation limiter stops 212, 214. Thus, the rotation of the stem assembly retaining pin 154, and therefore the stem assembly body 152, is limited.

In an exemplary embodiment, the rotation limiter stops 212, 214 are arcuate extensions disposed on opposite side of the axis of rotation of the stem assembly body 152, or, the longitudinal axis of the stem assembly body 152. Further, in this embodiment, the rotation limiter stops 212, 214 each extend over an arc of about, or just less than, ninety degrees. In this configuration, the stem assembly body 152 is structured to rotate about ninety degrees.

The seal cap assembly 250, in an exemplary embodiment, includes a cap nut 252, a seal cap 254, and a number of gaskets 256, 257 (two shown). The seal cap assembly cap nut 252 includes a hollow, generally cylindrical body 260 with an upper, first end 262 and a lower, second end 264. The seal cap assembly cap nut body first end 262 includes an inwardly extending flange 266. The seal cap assembly cap nut body second end 264 includes an inner thread 268 that is structured to, and does, threadably engage the neck bushing body threaded upper portion 66.

The seal cap assembly seal cap 254 includes a body 270 with a lower portion 272 and an upper portion 274. The seal cap assembly seal cap body lower portion 272 defines a generally circular flange 276 and an axial, non-circular cavity 278. The seal cap assembly seal cap body lower portion cavity 278 is sized and shaped to correspond to the stem assembly body upper end upper portion 170. That is, the stem assembly body upper end upper portion 170 fits within, and in an exemplary embodiment, snuggly corresponds to, the seal cap assembly seal cap body lower portion cavity 278. In this configuration, the seal cap assembly seal cap body 270 is fixed to the stem assembly body upper end upper portion 170. Thus, rotation of the seal cap assembly seal cap 254 causes the stem assembly body 152 to rotate. The seal cap assembly seal cap body upper portion 274 is, in an exemplary embodiment, a non-cylindrical portion and, as shown, includes two opposing generally planar surfaces.

The seal cap assembly gasket 256 includes a resilient, toroid body 280. The seal cap assembly gasket body 280 has an inner diameter sized to extend about the stem assembly retaining pin 154 path of travel and any rotation limiter stops 212, 214. The seal cap assembly gasket body 280 has an outer diameter sized to fit within the seal cap assembly cap nut 252.

The seal cap assembly 250 is configured as follows. The seal cap assembly gasket 256 is disposed over the stem assembly body upper end 160 and abuts the neck bushing body first axial surface 61. The seal cap assembly seal cap body 270 is fixed to the stem assembly body upper end upper portion 170. In this configuration, the seal cap assembly seal cap body 270 traps the seal cap assembly gasket 256 on the stem assembly body 152. The seal cap assembly cap nut 252 is disposed over the seal cap assembly seal cap body 270 and threadably engages the neck bushing body threaded upper portion 66. The seal cap assembly cap nut body first end flange 266 engages the seal cap assembly seal cap body lower portion flange 276. Further rotation of the seal cap assembly cap nut 252 moves the seal cap assembly seal cap body 270 toward the neck bushing body first axial surface 61 thereby causing the seal cap assembly gasket 256 to sealingly engage the neck bushing body first axial surface 61. It is noted that if fluid escapes past stem assembly seals 156, the configuration of the seal cap assembly 250, as described herein, creates a sealed chamber. That is, the escaped fluid does not further escape to the atmosphere (unless the seal cap assembly 250 is dis assembled). In an exemplary embodiment, the seal cap assembly 250 includes an anti-friction ring that is disposed between the seal cap assembly cap nut body first end flange 266 and the seal cap assembly seal cap body lower portion flange 276. Further, seal cap assembly gasket 257 also reduces friction during the rotation of seal cap 254 and is, as used herein, an "anti-friction gasket." That is, as used herein, an "anti-friction gasket" is a gasket that is also structured to reduce friction.

In an exemplary embodiment, the valve body 12 further includes an access fitting 300. The access fitting 300 is an additional valve that is structured to, and does, provide access to the valve body passage 11. That is, the valve body first end 20 includes a radial passage 302 to which the access fitting 300 is coupled. The access fitting 300 is coupled to the valve body 12 by brazing. The valve body first end radial passage 302, and therefore the access fitting 300, is disposed a first minimal distance from the first transition portion 22. As used herein, a "first minimal distance" means a distance sufficient so that heat generated during the coupling of the access fitting 300 to the valve body 12 does not anneal and affect the strength of the first transition portion 22. As used herein, "heat generated . . . affect the strength of the first transition portion" means that the heat does not cause annealing heat treatment of the transit portion to downgrade the material strength on holding thrust force by adjustable seat and fluid pressure.

Figures 3A, 3B:
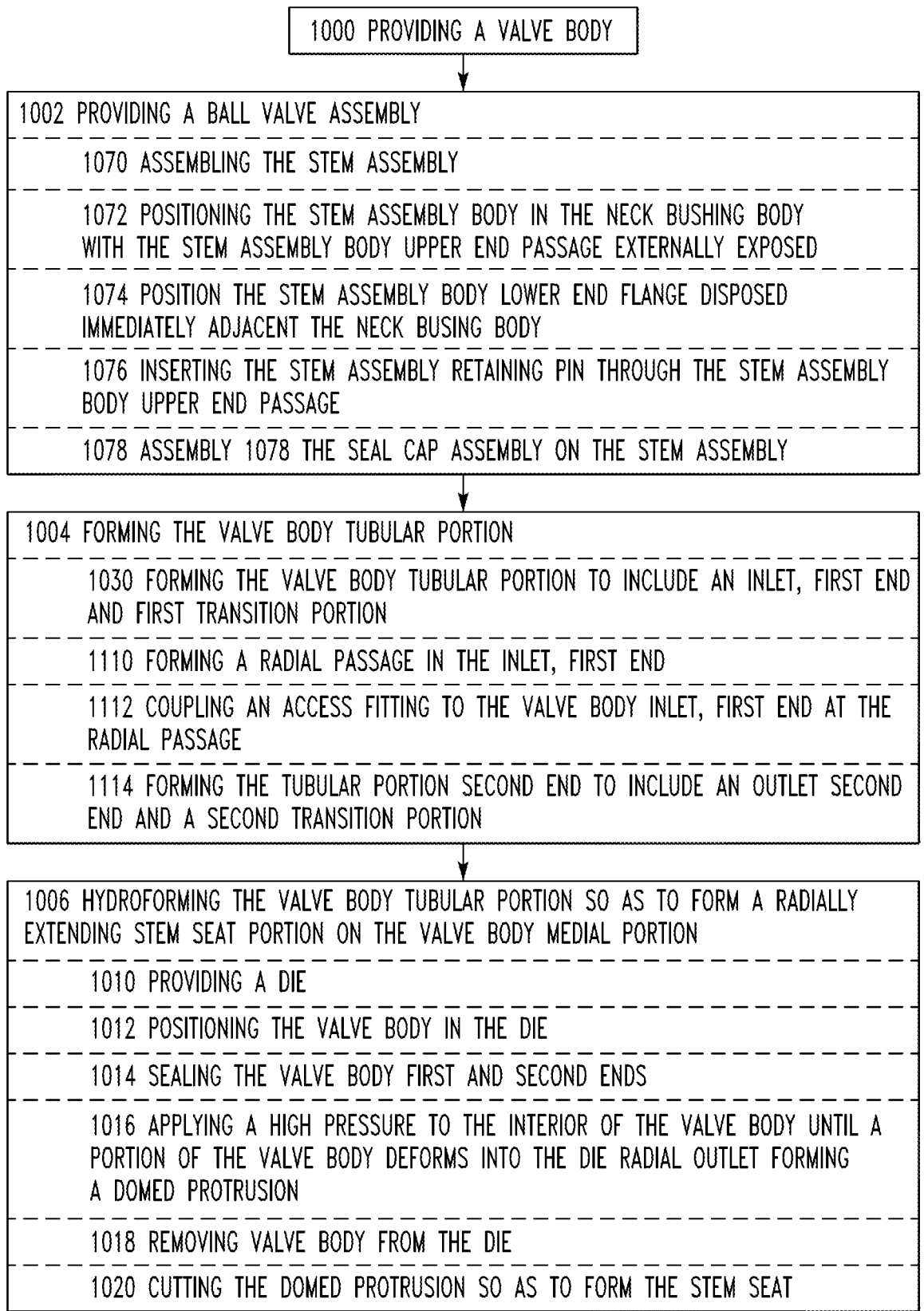
FIGS. 3A-3B are a flow chart of the disclosed method.
Figure 4A:
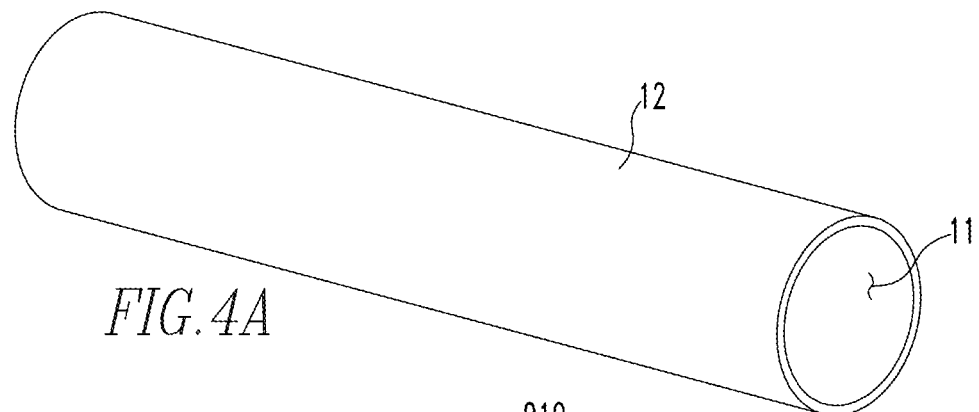
FIGS. 4A-4O show the forming of the valve assembly.

The method of creating the ball valve 10 described above includes the following. As the following discussion relates to the method of creating the ball valve 10, the description shall primarily include the reference numbers for the method and shall generally not include reference numbers for the ball valve 10 elements. It is understood that the ball valve 10 elements described below are the same as the ball valve 10 elements described above and the same reference numbers used above apply to the ball valve 10 elements recited below. Further, the method steps are shown in FIGS. 3A-3C. FIGS. 4A-4O show the valve assembly 10 during the stages of forming and assembly.

Providing 1000 a generally cylindrical valve body 12 (as shown in FIG. 4A), providing 1002 a ball valve assembly as described above, forming 1004 the valve body including hydroforming 1006 the valve body so as to form a radially extending stem seat on the valve body medial portion, and coupling 1008 the ball valve assembly to the valve body.

Figure 4B:
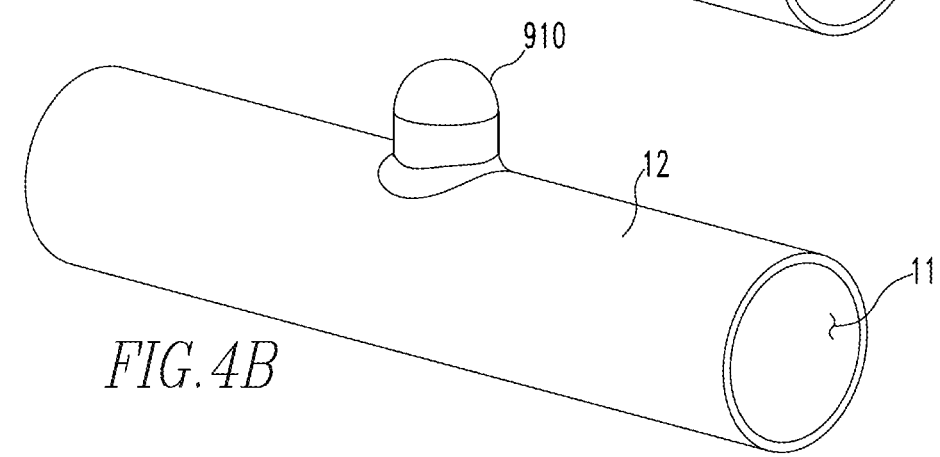
Figure 4C:
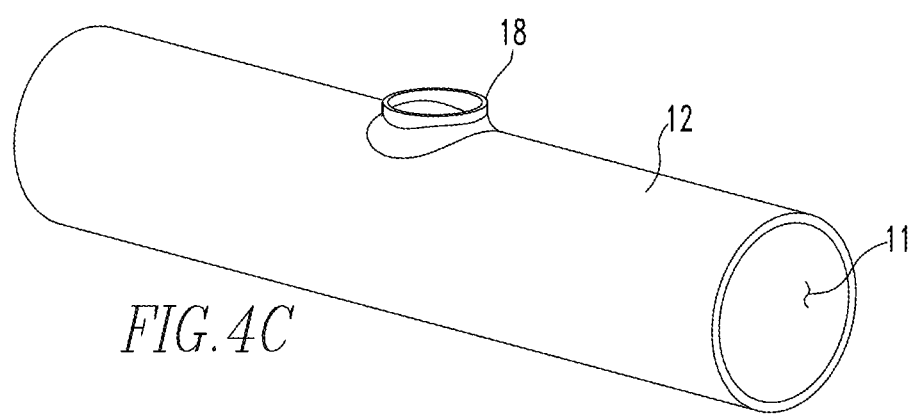
Figure 5A:
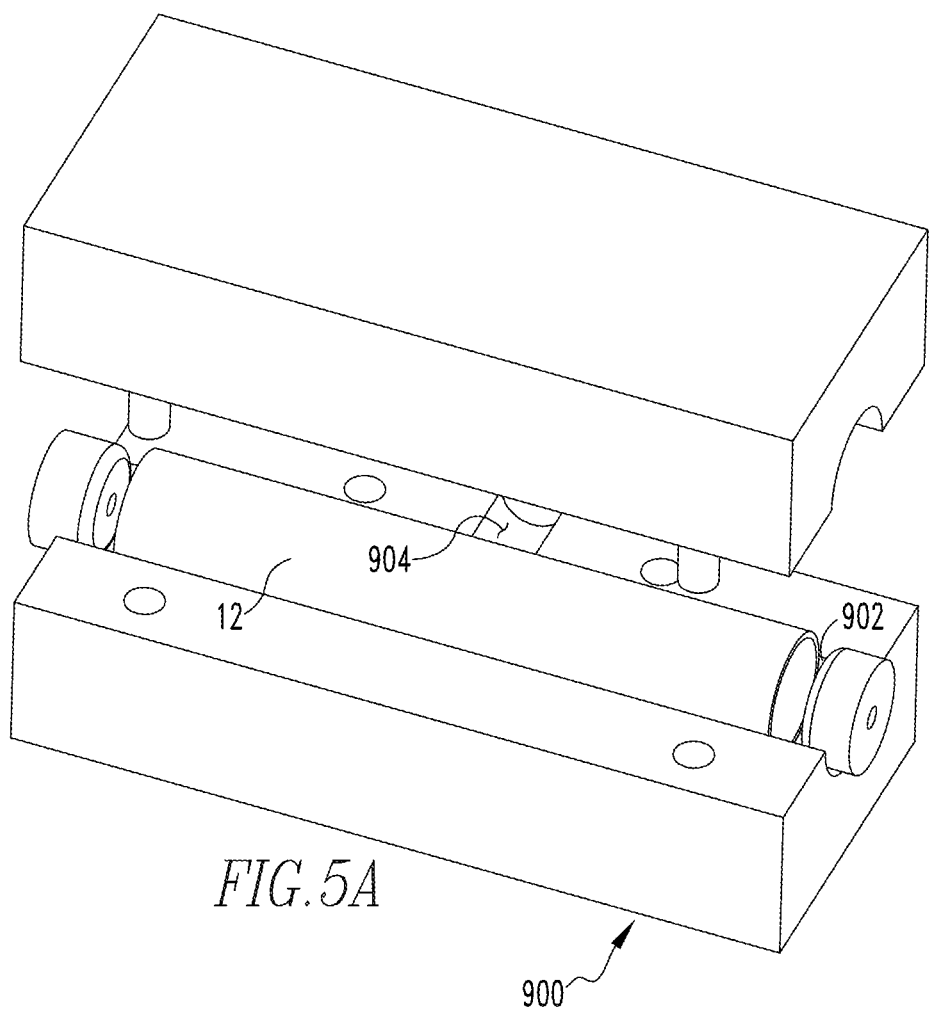
FIG. 5A is an isometric view of a forming die.
Figure 5B:
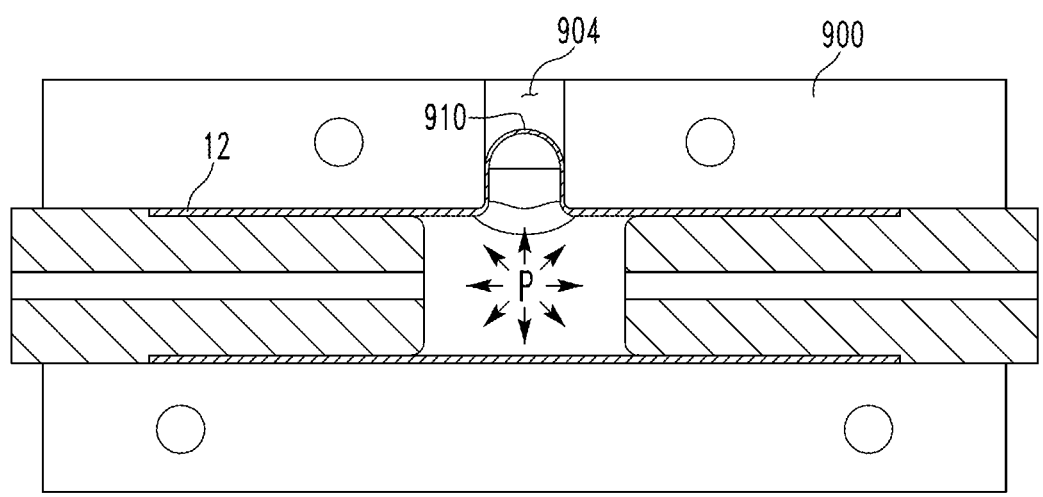
FIG. 5B is a cross-sectional view of the forming die.

Hydroforming 1006 the valve body so as to form a radially extending stem seat includes providing 1010 a die 900 having a generally cylindrical passage 902 with a radial outlet 904, as shown in FIG. 5A, positioning 1012 the valve body 12 in the die 900, sealing 1014 the valve body first and second ends 20, 28, applying 1016 a high pressure to the interior of the valve body 12 until a portion of the valve body 12 deforms into the die radial outlet 904 forming a domed protrusion 910 (as shown in FIGS. 4B and 5B), removing 1018 valve body 12 from the die 900, and cutting 1020 the domed protrusion 910 so as to form the stem seat 18 (FIG. 4C). As used herein, a "high pressure" means a pressure of above 20,000 psi. In an exemplary embodiment, the hydroforming 1006 the valve body occurs at "ambient" temperature. As used herein, "ambient" temperature means between about 5° C. and about 40° C.

Figure 4D:
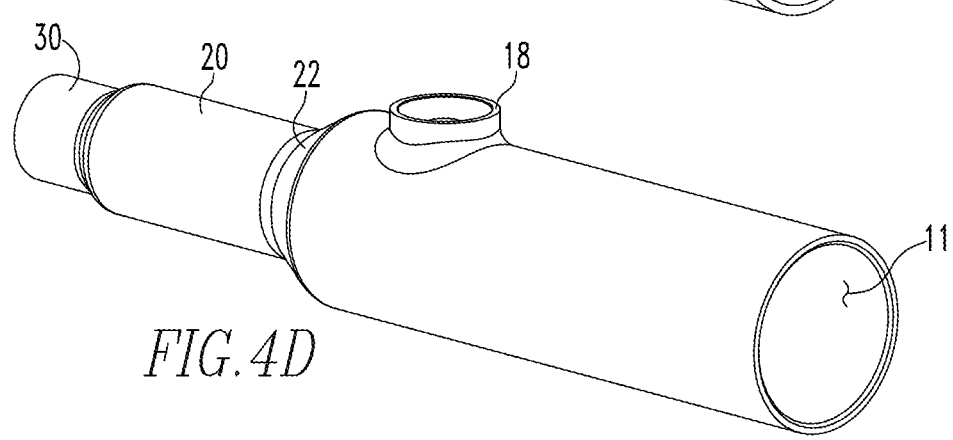
Figure 4E:
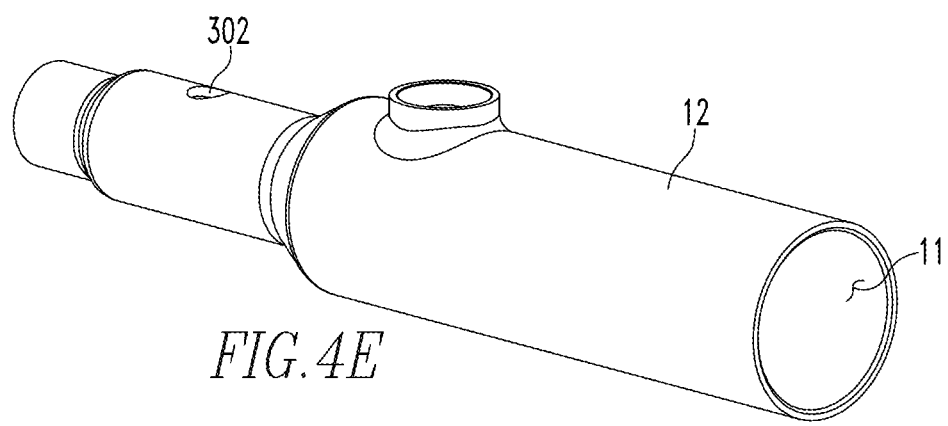

Forming 1004 the valve body 12 further includes forming 1030 the valve body 12 to include an inlet, first end and a first transition portion (FIG. 4D), wherein the valve body inlet, first end has a first cross-sectional area, the medial portion has a maximum cross-sectional area, and the first transition portion transitions generally smoothly from the first cross-sectional area to the maximum cross-sectional area. Further, coupling 1008 the ball valve assembly to the valve body includes fixing 1040 the neck bushing body to the stem seat (FIG. 4F), inserting 1042 the first end valve seat into the valve body via the second end, positioning 1044 the first end valve seat contoured outer surface immediately adjacent the inner surface of the first transition portion (FIG. 4G), and inserting 1046 the stem assembly into the valve body 12 (FIGS. 4H and 4M). Inserting 1046 the stem assembly into the valve body 12 includes inserting 1050 the stem assembly body into the valve body via the second end, positioning 1052 the stem assembly in the valve body medial portion, and, moving 1056 the stem assembly body generally radially into the stem seat, and positioning 1058 the stem assembly body substantially in the neck bushing body.

Fixing 1040 the neck bushing body to the stem seat portion includes pancake brazing 1060 the neck bushing body to the stem seat. In an exemplary embodiment, brazing 1060 the neck bushing body to the stem seat occurs before inserting 1042 the first end valve seat into the valve body via the second end and inserting 1046 the stem assembly into the valve body 12.

Providing 1002 a ball valve assembly includes assembling 1070 the stem assembly. Assembling 1070 the stem assembly includes positioning 1072 the stem assembly body in the neck bushing body with the stem assembly body upper end passage externally exposed, positioning 1074 the stem assembly body lower end flange disposed immediately adjacent the neck bushing body, inserting 1076 the stem assembly retaining pin through the stem assembly body upper end passage (FIG. 4N, and assembling 1078 the seal cap assembly on the stem assembly (FIG. 4O). In this configuration, the stem assembly body is trapped on the neck bushing body. As used herein, "externally exposed" means adjacent the neck bushing body first axial surface 61.

Further, coupling 1008 the ball valve assembly to the valve body includes inserting 1080 the ball valve assembly ball valve member into the valve body via the valve body via the second end, positioning 1082 the ball valve assembly ball valve member substantially in the valve body medial portion, threadably coupling 1084 the ball valve assembly second end valve seat and the toroid body, inserting 1086 the ball valve assembly second end valve seat into the valve body via the valve body via the second end, positioning 1088 the second end valve seat substantially in the valve body medial portion with the toroid body disposed adjacent the valve body second transition portion (FIG. 4I), crimping 1090 the valve body second transition portion inwardly at a location corresponding to the toroid body groove so that the valve body is coupled to the toroid body (FIG. 4J), further adjusting 1092 the threadable coupling between the ball valve assembly second end valve seat and the toroid body so as to compress the ball valve assembly ball valve member.

Figure 4F:
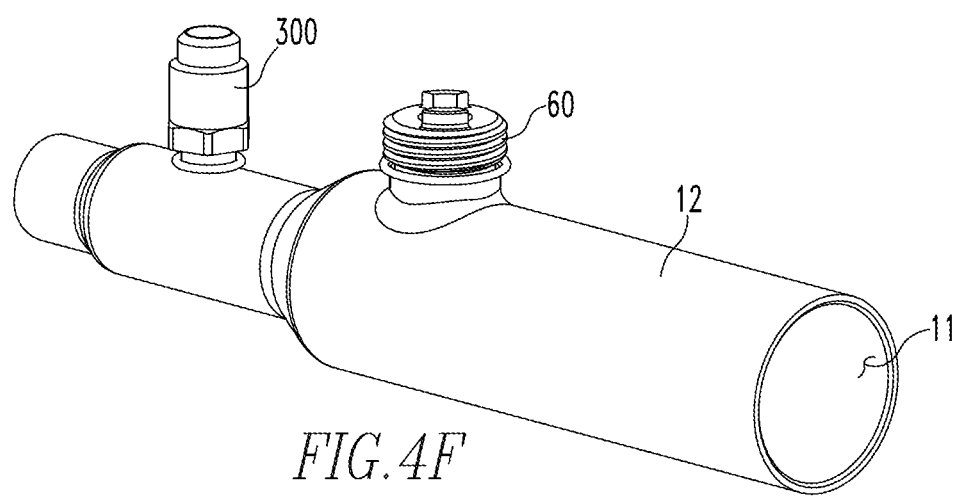
Figure 4G:
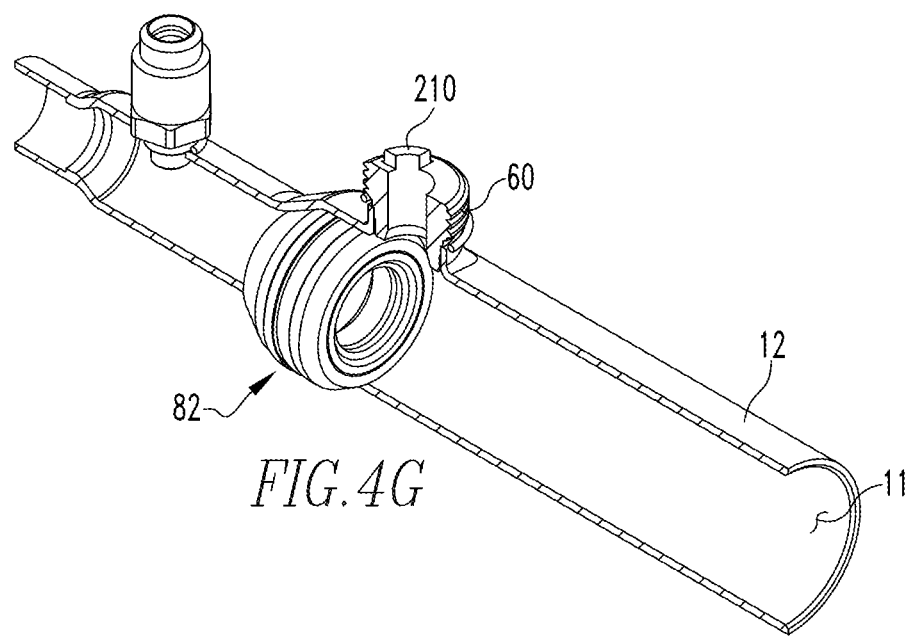
Figure 4H:
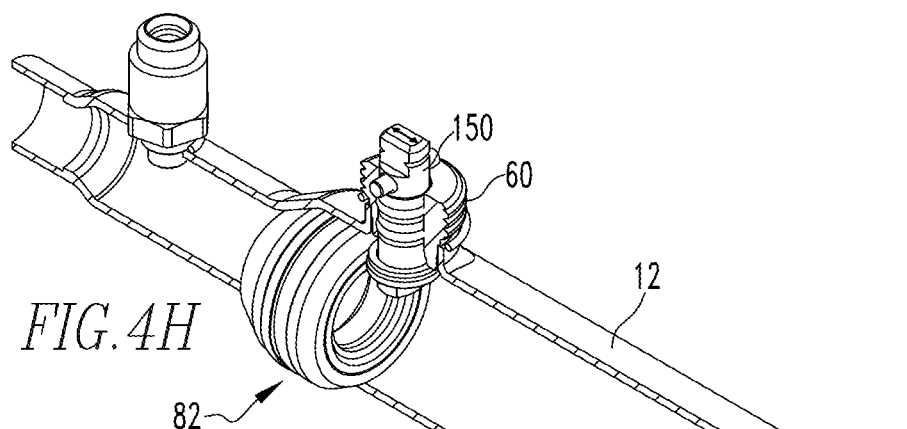
Figure 4I:
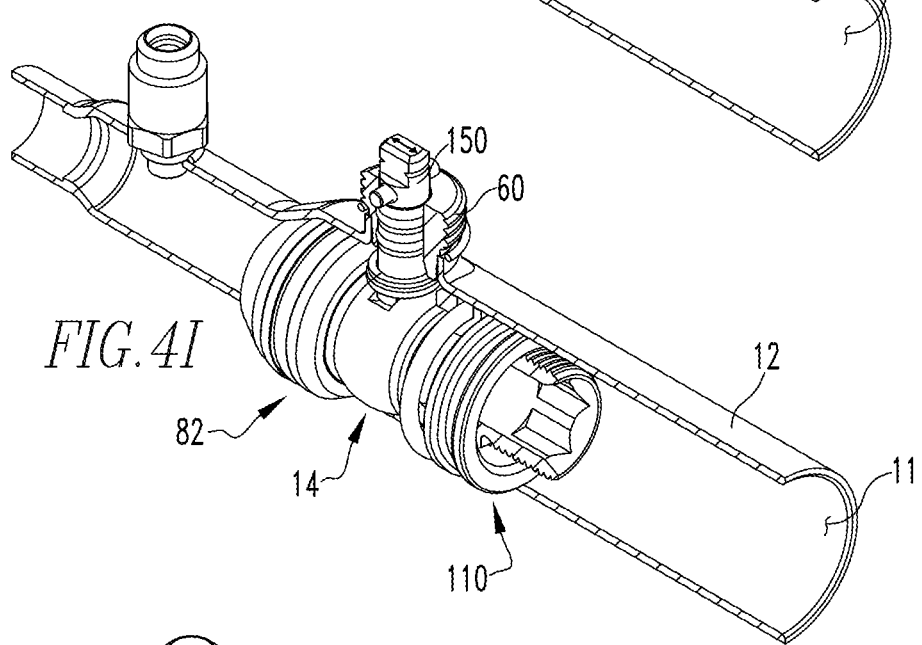
Figure 4J:
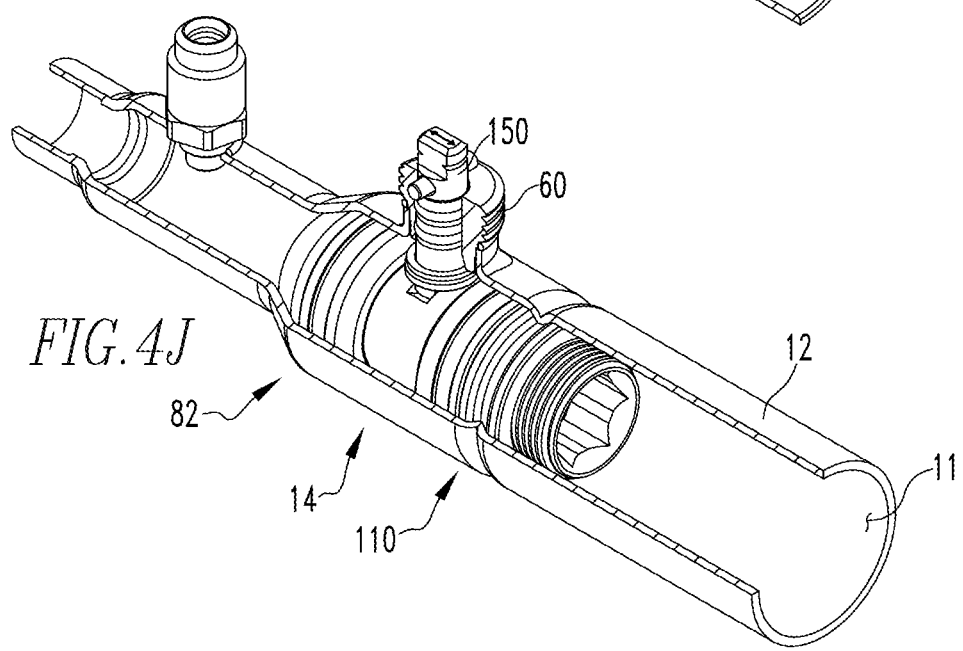
Figure 4K:
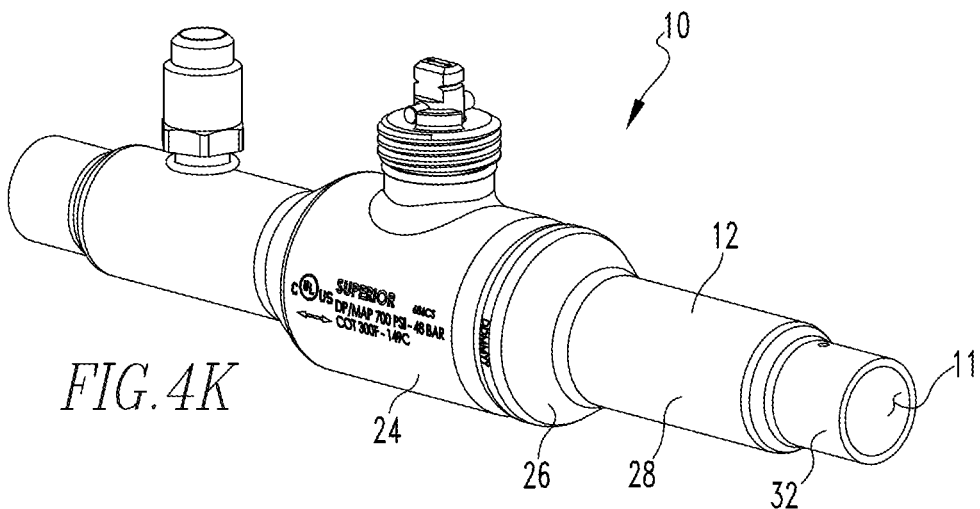
Figure 4L:
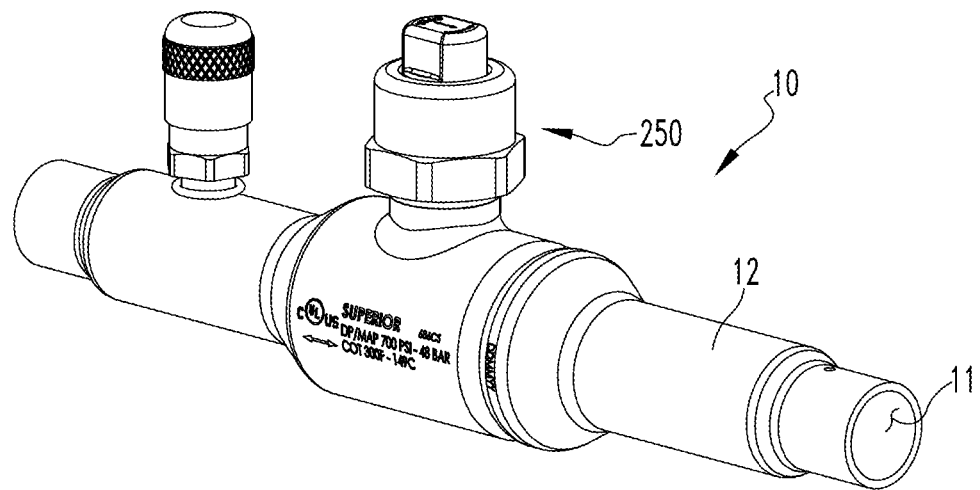
Figure 4M:
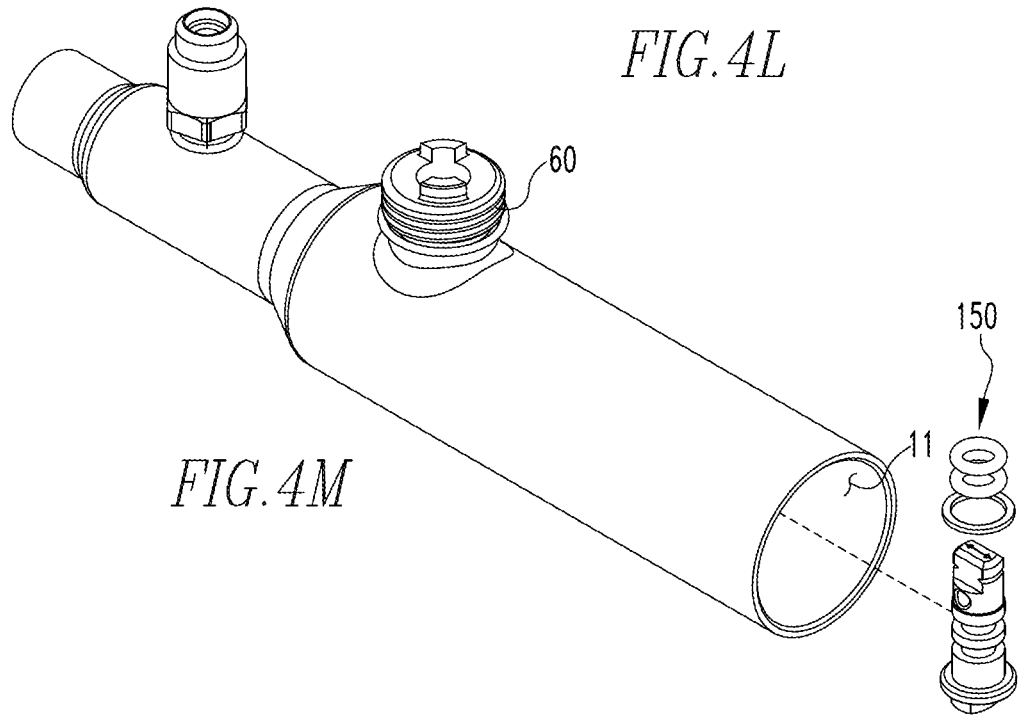
Figure 4N:
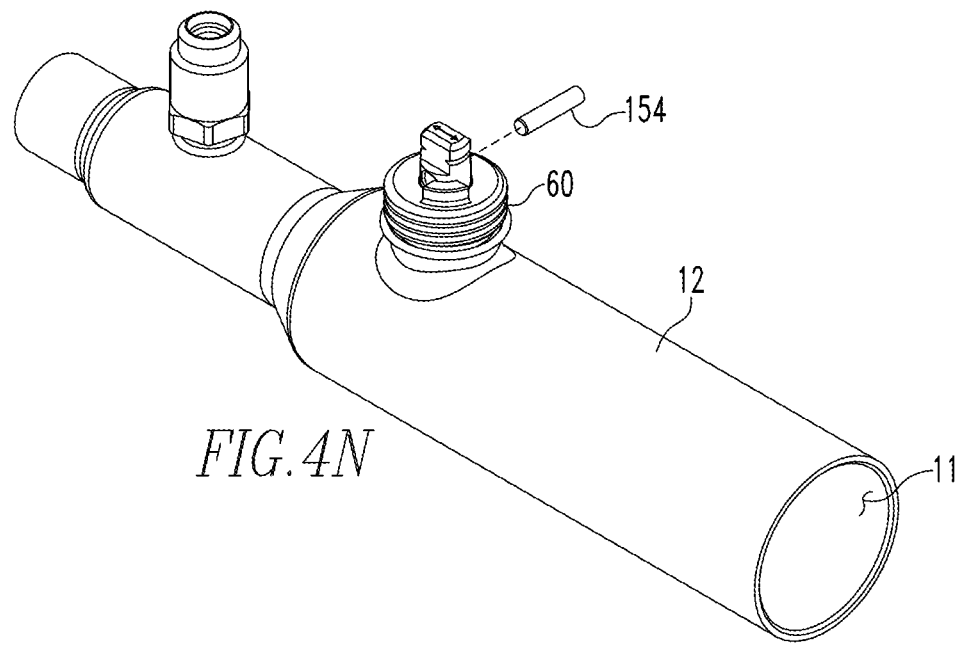
Figure 4O:
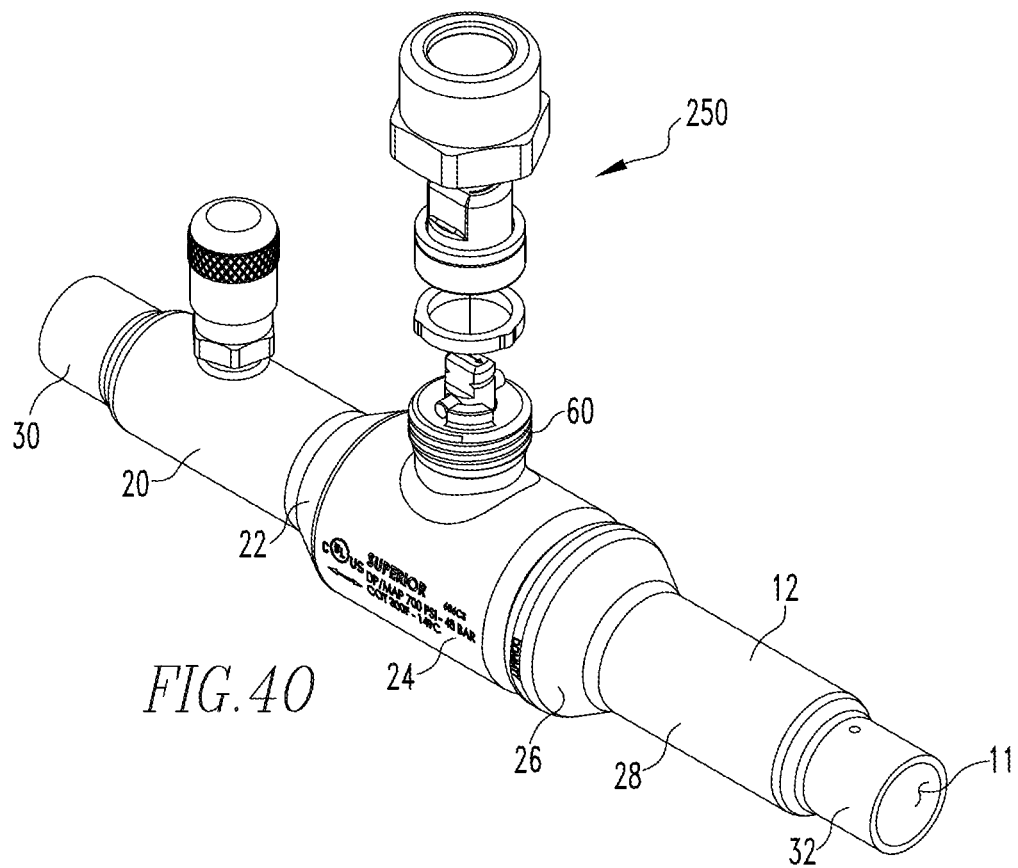

Additionally, forming 1004 the valve body includes forming 1110 a radial passage in the inlet (FIG. 4E), first end and coupling 1112 an access fitting to the valve body inlet, first end at the radial passage (FIGS. 4F, 4K, and 4L). Forming 1004 the valve body also includes forming 1114 the valve body second end to include an outlet, second end and a second transition portion wherein the valve body outlet, second end has a second cross-sectional area that is less than the medial portion maximum cross-sectional area, and the second transition portion transitions generally smoothly from the second cross-sectional area to the maximum cross-sectional area (FIG. 4O).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A ball valve comprising:
a valve body including:
an elongated, generally tubular portion, and
a stem seat extending generally radially from said tubular portion; and
a ball valve assembly coupled to said valve body at said stem seat, said ball valve assembly including:
a neck bushing fixed to said stem seat, said neck bushing including a body having:
a substantially circular passage, and
a generally planar axial surface; and
a stem assembly including:
an elongated, generally cylindrical body rotatably disposed through, and trapped in the passage of said neck bushing body, said generally cylindrical body comprising:
a first radius,
a radially extending passage, and
an elongated retaining pin having a diameter sized to correspond to said radially extending passage and a length greater than twice the first radius;
wherein:
said retaining pin extends through said radially extending passage and is disposed immediately adjacent said axial surface of said neck bushing; and
said axial surface of said neck bushing body includes a rotation limiter including a number of first stops and a number of second stops that each extend axially from said axial surface and are disposed in a path of travel of said retaining pin of said stem assembly such that said retaining pin cannot move past said number of first stops and said number of second stops, thus limiting the rotation of said body of said stem assembly.

2. The ball valve of claim 1 wherein:
said valve body includes an inlet, first end, a first transition portion, a medial portion, a second transition portion, and an outlet, second end;
said medial portion having a maximum cross-sectional area;
said first end having a first cross-sectional area, wherein said first cross-sectional area is smaller than said maximum cross-sectional area;
said second end having a second cross-sectional area, wherein said second cross-sectional area is smaller than said maximum cross-sectional area; and
said ball valve assembly substantially disposed in said medial portion.

3. The ball valve of claim 2 wherein said stem seat has an increased radial thickness.

4. The ball valve of claim 2 wherein:
one of said valve body first end or said valve body second end includes an access fitting; and
said access fitting is disposed a first minimal distance from said first transition portion.

5. The ball valve of claim 1 wherein said body of said neck bushing includes an outer thread.

6. The ball valve of claim 1 wherein:
said ball valve assembly includes a seal cap assembly;
said seal cap assembly includes a cap nut, a seal cap, and a gasket; and
said seal cap structured to sealingly couple said gasket to said body of said stem assembly.

7. A ball valve comprising:
a valve body including:
an elongated, generally tubular portion, and
a hydroformed stem seat; and
a ball valve assembly,
wherein:
said stem seat extends generally radially from said tubular portion;
said tubular portion and said stem seat are unitary;
said ball valve assembly is coupled to said valve body at said stem seat;
said valve body includes an inlet, first end, a first transition portion, a medial portion, a second transition portion, and an outlet, second end;
said medial portion having a maximum cross-sectional area;
said first end having a first cross-sectional area, wherein said first cross-sectional area is smaller than said maximum cross-sectional area;
said second end having a second cross-sectional area, wherein said second cross-sectional area is smaller than said maximum cross-sectional area;
said ball valve assembly substantially disposed in said medial portion;
said ball valve assembly includes a stem assembly and a neck bushing;
said stem assembly including an elongated, generally cylindrical body with a first radius;
said neck bushing includes a body with a substantially circular passage generally corresponding to said stem assembly body first radius;
said neck bushing body is fixed to said stem seat;
said stem assembly body is rotatably trapped to said neck bushing body;
said neck bushing body includes a generally planar first axial surface and a generally planar second axial surface;
said stem assembly body includes an upper end, a medial portion, and a lower end;
said stem assembly body upper end includes a radially extending passage;
said stem assembly body lower end includes a radially extending flange;
said stem assembly includes an elongated retaining pin;
said stem assembly retaining pin has a diameter sized to correspond to said stem assembly body upper end passage and a length greater than twice said stem assembly body first radius;
said stem assembly body is disposed through said neck bushing body passage;
said stem assembly retaining pin extends through said stem assembly body upper end passage and disposed immediately adjacent said neck bushing body first axial surface;
said stem assembly body lower end flange is disposed immediately adjacent said neck bushing body second axial surface;
said stem assembly retaining pin and said stem assembly body lower end flange rotatably trap said stem assembly body on said neck bushing body;

said neck bushing body first axial surface includes a rotation limiter;

said rotation limiter including a number of first stops and a number of second stops;

said rotation limiter number of first stops and said rotation limiter number of second stops extending axially from said neck bushing body first axial surface;

said rotation limiter number of first stops and said rotation limiter number of second stops are disposed in the path of travel of said stem assembly retaining pin;

said stem assembly retaining pin cannot move past said rotation limiter number of first stops and said rotation limiter number of second stops; and the rotation of said stem assembly body is limited.

8. The ball valve of claim 7 wherein said body of said neck bushing includes an outer thread.

9. The ball valve of claim 7 wherein:

said ball valve assembly includes a seal cap assembly;

said seal cap assembly includes a cap nut, a seal cap, and a gasket; and said seal cap structured to sealingly couple said gasket to said body of said stem assembly.

10. The ball valve of claim 7 wherein said stem seat has an increased radial thickness.

11. The ball valve of claim 7 wherein:

one of said valve body first end or said valve body valve body second end includes an access fitting; and said access fitting is disposed a first minimal distance from said first transition portion.

\* \* \* \* \*